(12) United States Patent
Meier

(10) Patent No.: US 8,132,013 B2
(45) Date of Patent: Mar. 6, 2012

(54) LONG-TERM AUTHENTICITY PROOF OF ELECTRONIC DOCUMENTS

(75) Inventor: Beat U. Meier, Uitikon (CH)

(73) Assignee: SAP AG, Walldorf (DE)

( * ) Notice: Subject to any disclaimer, the term of this patent is extended or adjusted under 35 U.S.C. 154(b) by 983 days.

(21) Appl. No.: 11/239,378

(22) Filed: Sep. 30, 2005

(65) Prior Publication Data

US 2006/0075245 A1    Apr. 6, 2006

Related U.S. Application Data

(60) Provisional application No. 60/614,039, filed on Sep. 30, 2004.

(51) Int. Cl.
*G06F 21/00* (2006.01)

(52) U.S. Cl. ........ 713/176; 713/167; 713/181; 713/191; 713/193; 705/57

(58) Field of Classification Search ................ 380/276, 380/277, 278, 284, 286; 713/182, 183, 184, 713/185, 176, 181, 191, 193; 726/28, 30, 726/33, 7; 714/22–30; 716/10, 11, 13, 18
See application file for complete search history.

(56) References Cited

U.S. PATENT DOCUMENTS

| | | | |
|---|---|---|---|
| 6,021,491 A | 2/2000 | Renaud | |
| 6,367,013 B1 * | 4/2002 | Bisbee et al. | 713/178 |
| 6,839,843 B1 | 1/2005 | Bacha et al. | |
| 6,889,209 B1 * | 5/2005 | Rabin et al. | 705/57 |
| 2001/0002485 A1 * | 5/2001 | Bisbee et al. | 713/167 |
| 2001/0037454 A1 | 11/2001 | Botti et al. | |
| 2002/0062451 A1 * | 5/2002 | Scheidt et al. | 713/201 |
| 2002/0135801 A1 * | 9/2002 | Tessman et al. | 358/1.15 |
| 2002/0194484 A1 | 12/2002 | Bolosky et al. | |
| 2003/0105950 A1 * | 6/2003 | Hirano et al. | 713/100 |
| 2003/0110376 A1 | 6/2003 | Wiener et al. | |
| 2003/0120939 A1 * | 6/2003 | Hughes et al. | 713/191 |
| 2003/0190046 A1 * | 10/2003 | Kamerman et al. | 380/286 |
| 2004/0123111 A1 * | 6/2004 | Makita et al. | 713/176 |
| 2004/0128512 A1 * | 7/2004 | Sharma et al. | 713/176 |

(Continued)

FOREIGN PATENT DOCUMENTS

DE    199 60 977 A1    7/2000

(Continued)

OTHER PUBLICATIONS

D. Pinkas, "Policy Requirements for Time-Stamping Authorities", Nov. 1, 2003.*

(Continued)

*Primary Examiner* — Taghi Arani
*Assistant Examiner* — Gregory Lane
(74) *Attorney, Agent, or Firm* — Finnegan, Henderson, Farabow, Garrett & Dunner LLP

(57) ABSTRACT

Systems, methods and computer program products are disclosed for providing long-term authenticity proof of an electronic document having a digital signature, wherein the electronic document is digitally signed with a digital signature and the electronic document and its digital signature are archived in a data archive. Such methods, systems and computer program products may store the electronic document in a first data archive and store a hash value of the electronic document in a second data archive different from the first data archive. Long-term authenticity and integrity may be achieved by periodically re-signing, particularly time stamping the hash value in the second data archive.

36 Claims, 5 Drawing Sheets

U.S. PATENT DOCUMENTS

2005/0204141 A1* 9/2005 Sayers et al. ............... 713/181
2006/0129847 A1* 6/2006 Pitsos ........................... 713/193

FOREIGN PATENT DOCUMENTS

| WO | WO 99/35785 | * | 7/1999 |
| WO | WO03024018 | * | 9/2001 |
| WO | WO03007203 | * | 7/2002 |
| WO | WO 03/007203 A2 | | 1/2003 |
| WO | WO03007203 | * | 1/2003 |
| WO | WO 03/024018 A1 | | 3/2003 |
| WO | WO03024018 | * | 3/2003 |

OTHER PUBLICATIONS

European Communication and Search Report (4 pages), Oct. 31, 2006.

B. Schneier, "Applied Cryptography," Applied Cryptography, 1996, pp. 38-40.

IETF, "XML-Signature Syntax and Processing," W3C Recommendation, Feb. 12, 2002 (54 pages).

EPO Communication and Search Report, dated Dec. 11, 1006 (9 pages).

* cited by examiner

LONG-TERM AUTHENTICITY PROOF OF ELECTRONIC DOCUMENTS

CROSS REFERENCE TO RELATED APPLICATION

This application claims priority under 35 U.S.C. §119 to U.S. Provisional Application No. 60/614,039, filed Sep. 30, 2004, which is expressly incorporated herein by reference in its entirety.

FIELD OF THE INVENTION

The present invention generally relates to the area of electronic data processing. More particularly, embodiments of the invention relate to methods, computer systems and computer program products for providing long-term authenticity proof of electronic documents, such as for fulfilling certain legal requirements.

BACKGROUND INFORMATION

Data processing is commonly used, e.g., in the field of administration and management of enterprises, cost counting, cost allocation and bookkeeping. In various countries, recommendations and legal regulations have been released for the exchange of electronic documents in order to make the electronic exchange of documents and the electronic document itself suitable for being acknowledged as "documents" in the legal sense in the same way as traditional paper documents are. Examples for such recommendations are VAT guidelines and regulations of the European Union (EU) and CEN-Report for eInvoicing.

In Germany, electronic documents, particularly electronic invoices are acknowledged as documents in a legal sense provided that the electronic document, i.e. the electronic invoice, is digitally signed, that the receiver of the document verifies the signature and that the sender and receiver archive the document. Further, the signature has to comply with the German signature law. This means that the signature has to be a qualified signature. Further requirements on electronic documents, particularly invoices, are based on the principles of orderly bookkeeping. Regulations for an acknowledged archiving in a legal sense comprise that the electronic document to be archived has a qualified signature in case of electronic invoices, that the electronic document is stored on an unchangeable storage medium, that converted and unconverted data are archived with respect to an index comprising a link to a converting mechanism if applicable, and that the archiving procedure is recorded.

Using digital signatures requires a public key infrastructure (PKI). The main body of such an infrastructure, is a Certification Agency (CA) that issues, stores and distributes digital certificates ("electronic passports"). To acquire a digital certificate, a public and a secrete (also entitled private) key pair has to be generated locally. A certificate request, containing only the public key is sent to the Registration Agency (RA) of the CA or directly to the CA. The CA has defined processes to check the request e.g. personal appearance with passport at the RA may be required, and to issue the certificate. The secrete key has to be kept under complete control of the certificate owner, because it is used to digitally sign or decrypt documents. The public key may be used by the public (e. g. business partner) to verify signatures or to encrypt private or confidential messages for the certificate owner. Examples of CA's are VeriSign Inc. (Mountain View, Calif., USA) or TC TrustCenter AG (Hamburg, Germany). CA's and RA's are also known as Trusted Third Parties (TTP) and they usually offer services to retrieve certificates, to check for certificate revocation and for time stamping documents.

The time of validity of certificates is usually limited. Additionally, certificates can also be revoked before the time limit is reached, for example when the underlying secrete key may no longer be secret. Therefore a digitally signed document may need to be re-signed or a new time stamp may be applied by a trusted third party with the respective actual newest encryption technology before the time limit of the last used certificate is reached. By properly time stamping the document the continued authenticity of the original signer and the integrity of the document can be ensured over any time period, also in case that an older key applied or an older encryption technology applied may be cracked in the meanwhile.

Software applications and systems which provide a solution to part of the regulations pointed out above are known. Software applications for sending and receiving digitally signed electronic invoices are also known. The sending module allows on a sender's computer system creating a digital signature for documents, creating an envelope comprising the document and the digital signature, and sending the envelope to a receiver module on a receiver's computer system. The term "signed document" is alternatively used for the envelope.

Creating a digital signature comprises calculating a hash value which is unique for the document to be sent. The result of encrypting the hash value using the secrete key is equivalent to the digital signature. For transmission the digital signature may be converted into an ASCII code string. Suitable signature processes are known in the prior art.

The receiver module allows on a receiver's computer system receiving an electronic document via a communication interface, decrypting the signature by means of a public key of the sender, validating the signature, archiving the document, the signature, the public key of the sender, the result of a converting process, if applicable, and a report of these various processes, in passing the document to a business software system of the receiver. Validating the signature may, for example, be implemented by a method comprising calculating a hash value of the document by means of the same process that has been applied on the sender side and comparing that calculated hash value with the hash value obtained by decrypting the signature received with the document using the public key of the signer. Identity of both values reveals the originality and integrity of the document.

A hash value is also known as "digest". It is a number which is calculated for a document by a one-way function. The algorithm of the one-way function is highly sensitive with respect to changes in the document, and therefore the hash value is unambiguous for the document. However, it is not possible to retrieve information about the content of the document from the hash value. The algorithms for calculating hash values are public and not secret.

When an electronic document has to be transmitted confidentially it is encrypted with the public key before sending and transmitted in the encrypted form. It can be opened by the receiver only when he knows the secret key corresponding to the public key used upon encrypting the document. Because encryption and decryption of large documents using public key cryptography is expensive in terms of computing effort, public key cryptography is only used to exchange a symmetric secret key which is then used, to actually encrypt and decrypt the document using symmetric algorithms such as DES (Data Encrypting Standard of NBS).

In the context of this disclosure, a proof of authenticity is understood to be the proof that an electronic document comes from a specific person or legal entity defined in the digital certificate.

The security of the contemporarily used encrypting methods relies on the fact that it is presently not possible to reduce large numbers into prime factors with a fast algorithm. Even very fast programs require some thousand years of calculation time to reduce a number with two hundred digits into prime factors. However, in case that this could be done faster one day, the cryptosystem can be cracked.

For certain electronic documents, particularly for invoices under certain legal regulations, a proof of authenticity over many years is required. Examples for such electronic documents are contracts and invoices or generally, like in Germany, documents where a "qualified" digital signature is legally required.

Because the methods and algorithms for proving authenticity of electronic documents used at the time an electronic document is created and digitally signed, may become insecure (e.g., the method used may be cracked due to the development of the corresponding techniques) secure methods and algorithms must be reapplied periodically by re-signing or time stamping the electronic document and its digital signature. In the context of a legally qualified signature of an electronic documents it is prescribed to re-sign the electronic signature of documents in given time distances, wherein upon each re-signing a presently new encryption method can be used and therefore cracking of the signature, the key or the electronic document can be prevented.

However, fulfilling these requirements or legal requirements for time stamping an electronic document having a digital signature, requires a search for the documents to be time stamped in large archives, retrieving the documents with their digital signature, performing the time stamping process and re-storing the time stamped documents in an archive. In a state of the art time stamping process therefore the document itself to be time stamped must be available in the time stamping process. This is not only inefficient and requires an expensive archiving technology, but also provides a risk in security, because the electronic documents have to be retrieved, handled and transmitted. Further, it is presently nearly impossible to entrust a service provider with performing the time stamping process, because the electronic documents would have to be transferred to the service provider, requiring a lot of effort in order to fulfill the secrecy and privacy requirements and in order to avoid spying of sensitive data.

For example, time stamping of electronic documents is of practical interest in "electronic bill presentment and payment (EBPP) systems". Such systems provide for centralized and consolidated presenting and collecting of invoices for a sender or receiver of invoices. In such a system a service provider has for a certain time, typically three months or another accounting period, the required data and invoices for presenting the invoices and managing the payment. At the end of the accounting period the invoices are deleted in the system of the service provider for security reasons. For archiving purposes the service provider usually can store the data and invoices handled by his system on a data carrier, usually a CD-ROM, which is given to the customer of the EBPP system for archiving purposes.

The digital signature of the invoice provided by the service has to fulfill very high requirements, e.g. for allowing a pre-tax deduction. These legal requirements include time stamping within the validity of the last used signature certificate. Obviously, the effort involved in retrieving the documents for re-signing is very high. The EBPP system provider therefore would also like to offer long term archiving services, without the need of the original invoice data.

Thus, there is need for methods, software applications, data processing systems and computer programs providing a more efficient solution of at least a part of the problems described above. In particular, it is desirable to provide methods and systems for storing an electronic document having a digital signature in an improved manner allowing an easier long-term authenticity proof and further improved methods and systems for re-signing electronic documents having a digital signature.

The above description is based on the knowledge of the present inventor and not necessarily known in the prior art.

SUMMARY

Consistent with embodiments of the present invention, methods and systems may be implemented for providing long-term authenticity proof of an electronic document having a digital signature, wherein the electronic document is digitally signed with a digital signature, wherein the digital signature is constructed in a method which comprises calculating a hash value of the electronic document, and wherein the electronic document and its digital signature are archived in a data archive. Such methods and systems may store the electronic document in a first data archive and store hash information data comprising information about the hash value of the electronic document in a second data archive different from the first data archive.

In accordance with embodiments of the present invention, separating content (i.e., the electronic document) and data (i.e., the hash information data or the digital signature) required for proof of authenticity of digital documents, may ensure that the handling of the digitally signed electronic documents is simplified, particularly when the electronic document or its hash information data or digital signature is re-signed. Separating the original document and the authenticity proof chain allows standard archiving of the original document and outsourcing of the technically demanding re-signing process and authenticity proof to a third party or another internal or external service. Further, embodiments of the invention can reduce work, working time and costs upon archiving digitally signed electronic documents and particularly upon re-signing their digital signature.

Embodiments of the invention further relate to methods and systems for providing long-term authenticity proof of an electronic document having a digital signature, wherein the electronic document is digitally signed with a digital signature and the electronic document and its digital signature are archived in a data archive. Such methods and systems may comprise storing of the electronic document in a first data archive and storing of a hash value of the electronic document in a second data archive different from the first data archive. Long-term authenticity and integrity can be achieved by periodically re-signing, particularly time stamping the hash value in the second data archive.

An enterprise can outsource the re-signing process to a service provider running a corresponding software application performing a re-signing method on a separate computer system. One advantage of this is for small and medium size enterprises, which are not capable of running an extended information technology infrastructure. The service provider in such a scenario may receive the hash information data (the digital signatures) to be re-signed, process these hash information data (digital signatures) and forward them back to his customer (the enterprise). This process does not require transferring the original document to the service provider, thus reducing work and cost and avoiding confidentiality problems.

Embodiments of the invention are further directed to computerized systems, computer-readable media including a carrier signal, computer programs and computer program products, each comprising program code or instructions for processing electronic documents according to the above-mentioned methods and/or embodiments of the invention, as disclosed herein.

Computer programs consistent with embodiments of the invention can be installed as one or more programs or program modules on different hardware systems (computers of computer systems) and run separately and independently of each other in their entirety, being capable of performing the methods and other embodiments consistent with the present invention. The different systems may be connected in the form of a network to communicate with each other.

Additional objects and advantages of the various embodiments of the invention will be set forth in part in the description, or may be learned by practice of the invention. The objects and advantages of the embodiments of the invention will be realized and attained by means of the elements and combinations particularly pointed out in the appended claims. Embodiments of the invention are disclosed in the detailed description section and in the appended independent and dependent claims. The various embodiments can include and/or exclude different aspects, features and/or advantages, where applicable. In addition, various embodiments can combine one or more aspects or features of other embodiments, where applicable.

It is understood that both the foregoing general description and the following detailed description are exemplary and explanatory only and are not restrictive to the embodiments of the invention, as claimed. The description of aspects, features and/or advantages or particular embodiments should not be construed as limiting other embodiments or the claims.

BRIEF DESCRIPTION OF THE DRAWINGS

The accompanying drawings, which are incorporated in and constitute a part of this specification, illustrate one (several) embodiment(s) of the invention and together with the description, serve to explain the principles of the invention.

DETAILED DESCRIPTION

Figure 1:
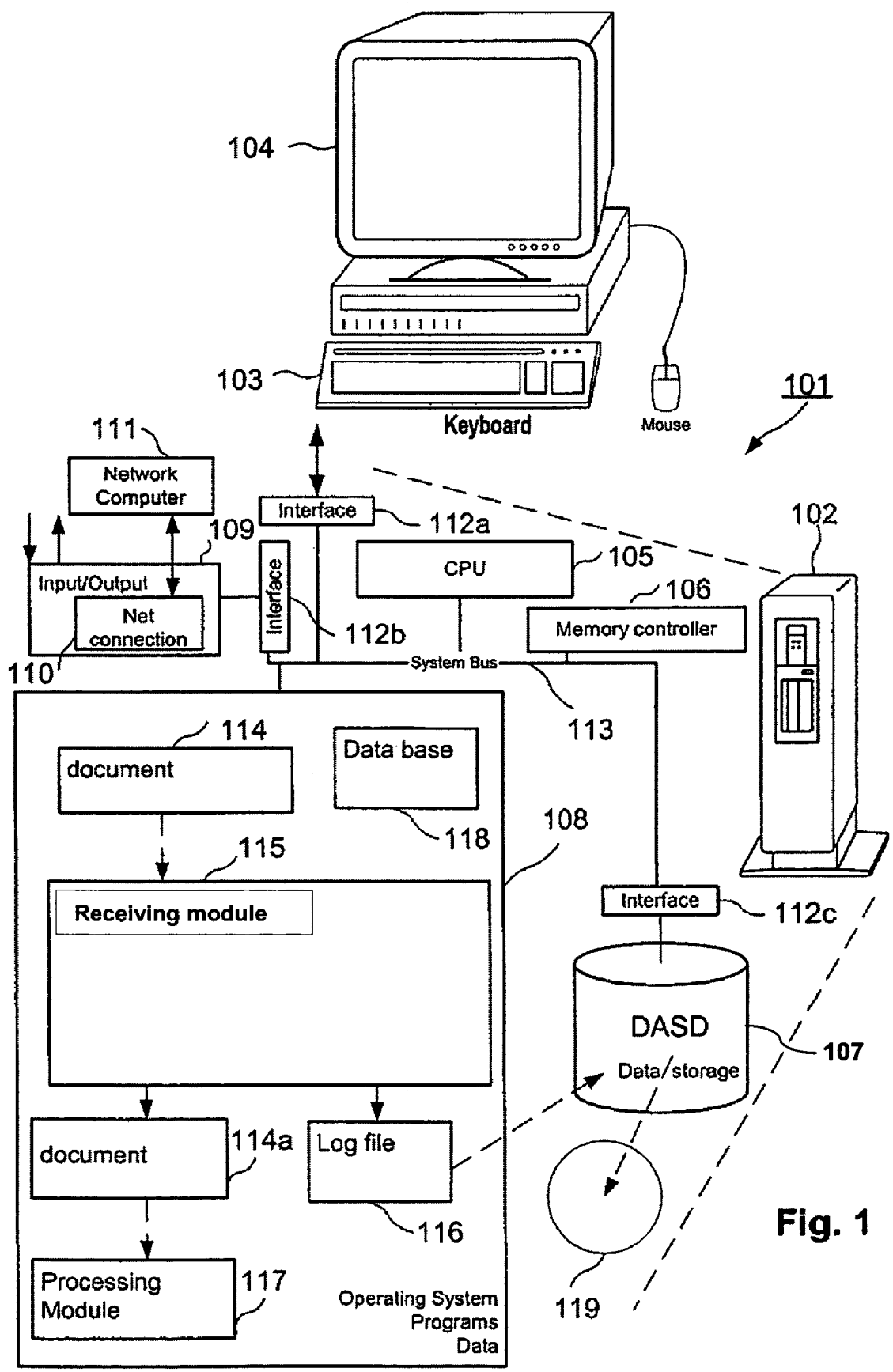
FIG. 1 is a block diagram for illustrating an exemplary computer system, consistent with an embodiment of the present invention.

Reference will now be made in detail to the present embodiments (exemplary embodiments) of the invention, examples of which are illustrated in the accompanying drawings. Wherever possible, the same reference numbers will be used throughout the drawings to refer to the same or like parts.

Within the context of this specification, the terms used shall have their usual meaning in the context of the field of data processing, particularly data encrypting and decrypting, unless defined otherwise. Particularly, a computer system broadly refers to any stand alone computer such as a personal computer or a laptop or a series of computers connected via a network, e.g. a network within a company, or a series of computers connected via the Internet. Computer systems and programs may be closely related. As used herein, phrases such as "the computer provides", "the program provides or performs specific actions" and "a user performs a specific action" are used to express actions by a computer system that may be controlled by a program or to express that the program or program module may be designed to enable the computer system to perform the specific action or to enable a user to perform the specific action by means of a computer system.

In this context, the term "automatically" is not intended to exclude a user's interaction with the computer system in the course of processing.

The disclosed methods as described in the summary section may be implemented, for example, by means of a computer system and a computer software which allows processing business software applications and which allows the use of databases or data base applications and Internet applications.

Electronic documents used with the invention may be in any conventional format, for example as a structured document like XML, HTML, EDIFACT, SWIFT document or in customer-specific record form. The term "structured document" thereby broadly refers to documents which contain an application-related assignment of values, e.g. XML, or to documents for which such assignment is contained in a separate electronic document, e.g. EDIFACT. In the field of electronic invoicing, electronic invoices may be of the type EDIFACT, XML, HTML, PDF and IDOC. An electronic document can be converted or reconverted into the applicable format.

In one preferred embodiment of the invention, the electronic document may be stored in a first data archive together with at least one of the following data: a signature specification, the date and time of the digital signature, the hash value of the electronic document, the digital signature of the electronic document. According to another or an additional embodiment, the hash information data may be stored in a second data archive together with at least one of the following data: a signature specification, the date and time of the digital signature, the digital signature of the electronic document.

In one embodiment, the following data may be stored upon storing a digitally signed document: the electronic document, a signature specification, the date and time of the digital signature and the digital signature of the electronic document comprising the hash information data about the hash value of the electronic document. The hash value can be retrieved from the digital signature using the secret key. According to embodiments of the invention, the electronic document can be stored in a first data archive and the hash information data comprising information about the hash value of the electronic document is stored in a second data archive which may be different from the first data archive. The signature specification, the date and time of the digital signature and the digital signature can be stored either in the first data archive or the second archive. However, if redundancy is required or not to be avoided, the signature specification, the date and time of the digital signature and the digital signature can be stored both in the first data archive and the second archive, just as the hash information data which can be stored also in the first data archive in addition to the second data archive.

In a preferred embodiment, the hash information data stored in the second data archive may comprise at least one of the following: the hash value of the electronic document, data from which the hash value of the electronic document can be retrieved or calculated, the digital signature of the electronic document, a time stamp of the digital signature.

An embodiment of the invention relates to a method in which the first data archive is stored on a first storage medium. The storage medium may be any kind of usual storage device, particularly a portable storage device such as magnetic disks (e.g. floppy disk or hard disk), optical devices (such as CD-ROM and DVD) or a flash memory device. The storage medium should be non-volatile and can be used for a secure storage of the data included.

A further embodiment comprises storing the second data archive in or on a second storage medium, that second storage medium being preferably different from the first storage medium. The second storage medium may be of any applicable kind like the first storage medium. In case that the second storage medium is different from the first storage medium, i.e., that a physically different data carrier or storage device (of the same or of a different type of storage medium) is used, it is particularly easy to transmit the second storage medium to a service provider for re-signing the data included without the need to handle and to transmit the first storage medium, thereby also avoiding security risks with respect to the secret data included in the first data archive.

In a preferred embodiment, the electronic document stored in the first data archive may be a set of electronic documents comprising multiple, particularly numerous single electronic documents. One advantage of embodiments of the invention is in cases in which a great amount of electronic documents has to be digitally signed and archived in a manner allowing later re-signing of the electronic documents, for example for enterprises storing their issued and/or received invoices. In such cases, the set of electronic documents comprising multiple single electronic documents may be preferably stored on the same (identical) first storage medium allowing easier data handling and archiving.

The digital signature (or a hash value or hash information data) can be calculated and constructed for all electronic documents to be digitally signed together, for a subset of electronic documents or for each individual electronic document. According to embodiments of the invention, the hash information data can comprise a hash information (a data digital signature) for individual electronic documents for a subset of electronic documents comprised in the set of electronic documents, the hash information data can comprise a hash information data (a digital signature) for each individual electronic document of the set of electronic documents, the hash information data can comprise multiple hash information data (digital signatures), wherein at least of the hash information data is a hash information data for a subset of electronic documents or the hash information data can comprise a hash information data for each electronic document or only one common hash information data for all electronic documents. In all cases, it may be preferable when the hash information data of the set of electronic documents are stored in the same (identical) second data archive and further preferably preferred when the hash information data of the set of electronic documents are stored on the same (identical) second storage medium.

A further embodiment of the invention is characterized in that a hash information data stored in the second data archive comprises a hash value of the corresponding electronic document and the description of the algorithm used for calculating the hash value.

Another embodiment is characterized in that a hash information data stored in the second data archive comprises at least one of a reference value and an index value of the corresponding electronic document for a later retrieval of the electronic document for proving the authenticity of the electronic document in a verification process.

In one preferred embodiment, the digital signature comprises a time stamp from a trusted third party or a trusted authority. A trusted authority, for example, may be TC Trust Center.

According to another embodiment, the digital signature comprises a certificate or a reference to a certificate of an authorized person or a legal entity. In preferred embodiments, the digital signature is a qualified digital signature. A qualified digital signature can be granted only by specific certification agencies which have to fulfill very high requirements, also with respect to the hardware equipment, and have to be recognized as an accepted agency.

In another preferred embodiment of the invention, the first data archive is archived in a standard archive for storing data and the second data archive is archived in a re-sign archive different from the standard archive for a later re-signing of the hash information data stored in the second data archive.

Use of the inventive methods preferably allows to prove the authenticity of an electronic document in a verification process by retrieving the digitally signed electronic document from the first data archive, retrieving the corresponding hash value (particularly a time stamped hash value) of the electronic document from the second data archive and performing a standard digital signature verification process with the retrieved data. However, the requirement of proving the authenticity of an electronic document is probably a rare case in practice.

In still additional embodiments of the invention, the electronic document is an invoice or a credit note. However, any type of document, e.g., purchase orders, delivery notes, contracts, letters, faxes, may be processed by the disclosed embodiments of the invention and its adaptation thereof.

A further embodiment is characterized in that the digitally signed electronic document being digitally signed with a method according to the invention is re-signed by providing a new digital signature (a new time stamp) to the hash information data stored in the second data archive and storing the re-signed hash information data in a data archive. Preferably the re-signed hash information data is stored in the second data archive. According to legal requirements, it may be required to re-sign hash information data (the digital signature) in order to provide long-term authenticity of the data contained. Re-signing an electronic document is particularly periodically necessary before the certificate of the last time stamp or digital signature expires. There may be additional circumstances, where a re-signing is required or recommended, e.g. in the case of revocation of a certificate. The re-signed document also has be to retrievable up to the same required number of years, e.g. required by law, as the original document has to be retrievable.

In a preferred embodiment, re-signing comprises a time stamp from a trusted third party or a trusted authority or comprises a digital signature using a certificate of an authorized person or legal entity and at least fulfills the legal requirements of the original signature, e.g. contains a qualified digital signature. It is preferred when the re-signing with a new digital signature is performed before the most recent digital signature is revoked or its time of validity ends.

With methods according to the invention, it is possible to perform the re-signing of hash information data stored in the second data archive without retrieval of the electronic document corresponding to the hash information data, which electronic document is stored in the first data archive. Therefore, in preferred embodiments, the re-signing of the hash information data (i.e. the digital signature of the electronic document) can be performed by a service company.

In the rare case of proving the authenticity of an electronic document the authenticity of the electronic document is proved in a verification process by retrieving the electronic document from the first data archive, retrieving the corresponding re-signed hash value of the electronic document from the data archive and performing a standard digital signature verification process with the retrieved data.

Processors suitable for the execution of a computer program include, by way of example, both general and special purpose microprocessors and any one or more processors of any kind of digital computer. Generally, a processor will receive instructions and data from a read-only-memory or a random access memory or both. The essential elements of a computer are a processor for executing instructions and one or more memory devices for storing instructions and data. Generally, a computer will also include, or be operatively coupled to receive data from or transfer data to, or both, one or more storage devices (storage means) for storing data, e.g. magnetic, magneto-optical disks or optical disks. Information carriers suitable for embodying computer program instructions and data include all forms of non-volatile memory, including by way of example semi-conductor memory devices such as EPROM, EEPROM and flash memory devices; magnetic disks such as internal hard disks and removable disks; magneto-optical disks and CD-ROM and DVD-ROM disks. The processor and the memory can be supplemented by, or incorporated in, ASICs (Application-Specific Integrated Circuits).

To provide for interaction with a user, the invention can be implemented on a computer system having a display device such as a CRT (Cathode Ray Tube) or LCD (Liquid Crystal Display), a monitor for displaying information to the user and a keyboard and a pointing device such as a mouse or a trackball by which the user can provide input to the computer. Other kinds of devices can be used to provide for interaction with a user as well; for example, feedback provided to the user can be any form of sensory feedback, such as visual feedback, auditory feedback or haptic feedback; an input from the user can be received in any form, including acoustic, speech or haptic input.

Reference will now be made in detail to the principles of the invention and its embodiments by an explanation on the basis of a data processing process, examples of which are illustrated in the accompanying drawings.

Referring now to FIG. 1, an exemplary computer system 101 is illustrated that comprises computer 102 and operating means 103, 104, in accordance with an embodiment of the present invention. Those skilled in the art will appreciate that methods and apparatus of the present invention apply equally to any computer system, regardless of whether the computer system is a complicated multi-user computing apparatus or a single user device, such as a personal computer or workstation. Computer 102 suitably comprises a processor 105, a main memory 108, a memory controller 106, an auxiliary storage interface 112c, a general input/output interface 112b and a terminal interface 112a, all of which are interconnected via a system bus 113. Note that various modifications, additions or deletions may be made to computer system 101 illustrated in FIG. 1 within the scope of the present invention such as the addition of cache memory or other peripheral devices. FIG. 1 is presented to simply illustrate some of the salient features of computer system 101.

Processor 105 performs computation and control functions of computer system 101, and comprises a suitable central processing unit (CPU). Processor 105 may comprise a single integrated circuit, such as a microprocessor, or may comprise any suitable number of integrated circuit devices and/or circuit boards working in cooperation to accomplish the functions of a processor. Processor 105 may suitable execute (object-oriented) computer programs within main memory 108. Auxiliary storage interface 112c allows computer system 101 to store and retrieve information from auxiliary storage devices, such as magnetic disk (e.g. hard disks or floppy diskettes) or optical storage devices (e.g. CD-ROM). One suitable storage device is a direct access storage device (DASD) 107. As shown in FIG. 1, DASD 107 may be a hard disk drive which may read programs and data from a hard disk.

While the present invention has been (and will continue to be) described in the context of a fully functional computer system, those skilled in the art will appreciate that the mechanisms consistent with embodiments of the present invention are capable of being distributed as a program product in a variety of forms, and that embodiments of the invention apply equally regardless of the particular type of signal bearing media to actually carry out the distribution. Further examples of signal bearing media include: recordable type media such as floppy disks and CD-ROMs, and transmission type media such as digital and analogous communication links, including wireless communication links.

Memory controller 106, through use of a processor is responsible for moving requested information from main memory 108 and/or through auxiliary storage interface 112c to processor 105. While for the purposes of explanation, memory controller 106 is shown as a separate entity, those skilled in the art understand that, in practice, portions of the function provided by memory controller 106 may actually reside in the circuitry associated with processor 105, main memory 108 and/or auxiliary storage interface 112c.

Terminal interface 112a allows system administrators and computer programmers to communicate with computer system 101, normally through monitor 104, keyboard 103, mouse, trackball and the like, or through programmable workstations. Although the system 101 depicted in FIG. 1 contains only a single main processor 105 and a single system bus 113, it should be understood that the present invention applies equally to computer systems having multiple processors and multiple system buses. Similarly, although the system bus 113 of the preferred embodiment is a typical hard-wired, multidrop bus, any connection means that supports directional communication in a computer-related environment could be used.

Input/output interface 112b allows computer system 101 via processor 105 to communicate with general input/output means 109, including a net connection 110, for sending and/or receiving data, e.g. for a net connection with one or more further computer systems 111, or for sending or receiving of data to or from other parties. A plurality of computer systems like computer system 101, can be connected via the net connection 110 in the form of a network. In such a case, the network computers 111 can be used as further input/output means, including the use as further storage locations.

In one preferred embodiment, memory 108 suitably includes an operation system, programs and data, particularly an electronic document 114, receiving module 115, a converted electronic document 114a, a log file 116, a processing module 117, a database 118 available via DASD storage 107, and a CD/DVD burner 119.

It should be understood that for purposes of this application memory 108 is used in its broadest sense and can include Dynamic Random Access Memory (DRAM), Static RAM (SRAM), flash memory, cache memory, etc. While not explicitly shown in FIG. 1, memory 108 may be a single type of memory component or may be composed of many different types of memory components. For example, memory 108 and CPU 105 may be distributed across several different computers that collectively comprise system 101. It should also be understood that programs in memory 108 can include any and all forms of computer programs, including source code, intermediate code, machine code and any other representation of a computer program.

The operating system provides the basic functionality that controls the computer system 101. The operating system can comprise any suitable operating system, such as IBM's OS/400, OS/2, Microsoft's Windows, Java and the various types of UNIX. The database 117 provides the mechanism for persistently storing object data in the computer system 101 and can be any suitable, preferably relational database such as those available from IBM, Oracle or Microsoft.

Those skilled in the art will appreciate that more than one of the mentioned processors may work in parallel in a computer system.

Figure 2:
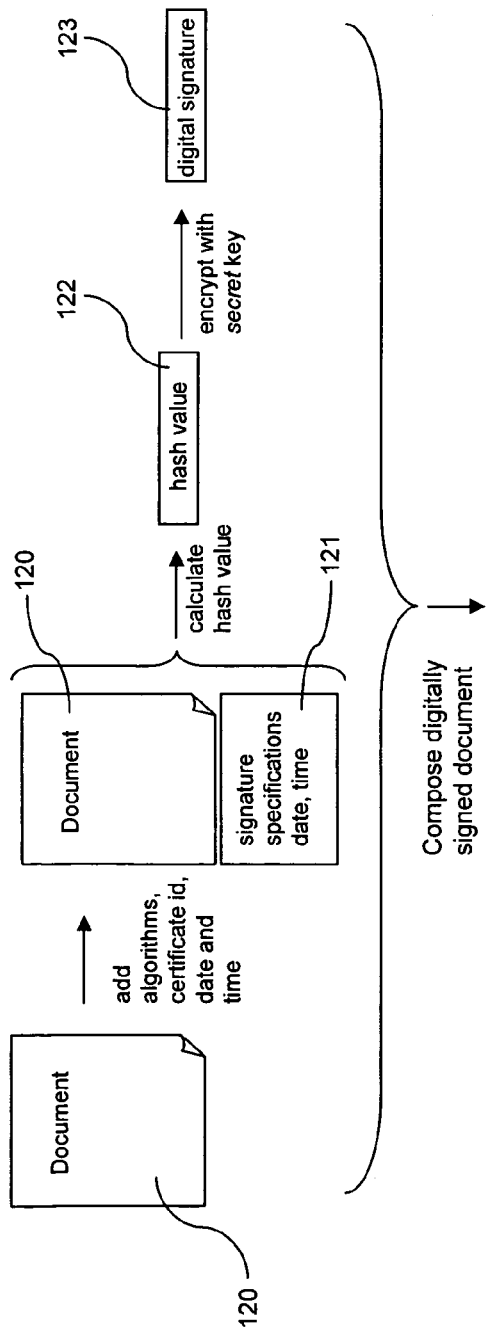
FIG. 2 is an exemplary sequence diagram illustrating both a standard digital signature process and a digital signature process, consistent with an embodiment of the present invention.

Referring to now to FIG. 2, the principle of a standard digital signature process for digitally signing an electronic document 120, consistent with an embodiment of the present invention ,is illustrated. To an electronic document 120, e.g., an invoice, are added hashing and signature algorithms, a certificate ID and date and time, resulting in an electronic document 120 comprising signature specifications 121 and date of time of its signature. To that electronic document a hash value 122 is calculated. The hash value 122 is encrypted with the secret key, thus providing a digital signature 123. In the next step the digitally signed document 124 is composed, comprising the electronic document 120, its signature specifications 121 and the digital signature 123. Optionally, the hash value 122 of the electronic document 120 and/or a public certificate may be included in the digitally signed document 124. For a qualified signature, the encryption step using the secret key has to be executed using certified hardware and may require the manual entry of a PIN or pass-phrase by the owner of the certificate.

According to known techniques, the digitally signed document 124 may be archived in a data archive, wherein a data entry in the data archive includes the elements of the digitally signed document 124 as shown in FIG. 2, i.e. the electronic document 120, the signature specification 121 and particularly its digital signature 123 comprising the hash information data.

According to embodiments of the invention, the hash information data, i.e. the digital signature 123 or the hash value 122, is stored in a second data archive different from the first data archive. More detailed, in the second data archive are stored a reference to the digitally signed document 124, the hash value 122, the hash value algorithm, and optionally, the digital signature parts 121 and 123 of the digitally signed document 124. The second data archive may also comprise the public certificate 125. One idea of embodiments of the invention is that the hash information data (e.g. the hash value 122) is stored in a separate second data archive.

Of course, the signature specification 121 can be stored in the first data archive, the second data archive or (if data redundancy is intended or not to be avoided) both in the first and second archive. The hash information data, the digital signature 123 and the hash value 122 can be stored in the first data archive too. The different possibilities of separating storing of the data of the digitally signed electronic document 124 in a first and in a second data archive are illustrated in FIG. 2 by differently dashed lines. With other words, the content of the digitally signed document 124, i.e. the electronic document 120, and the data required for proving its long term authenticity, i.e. it's hash value, are stored in different data archives.

Figure 3:
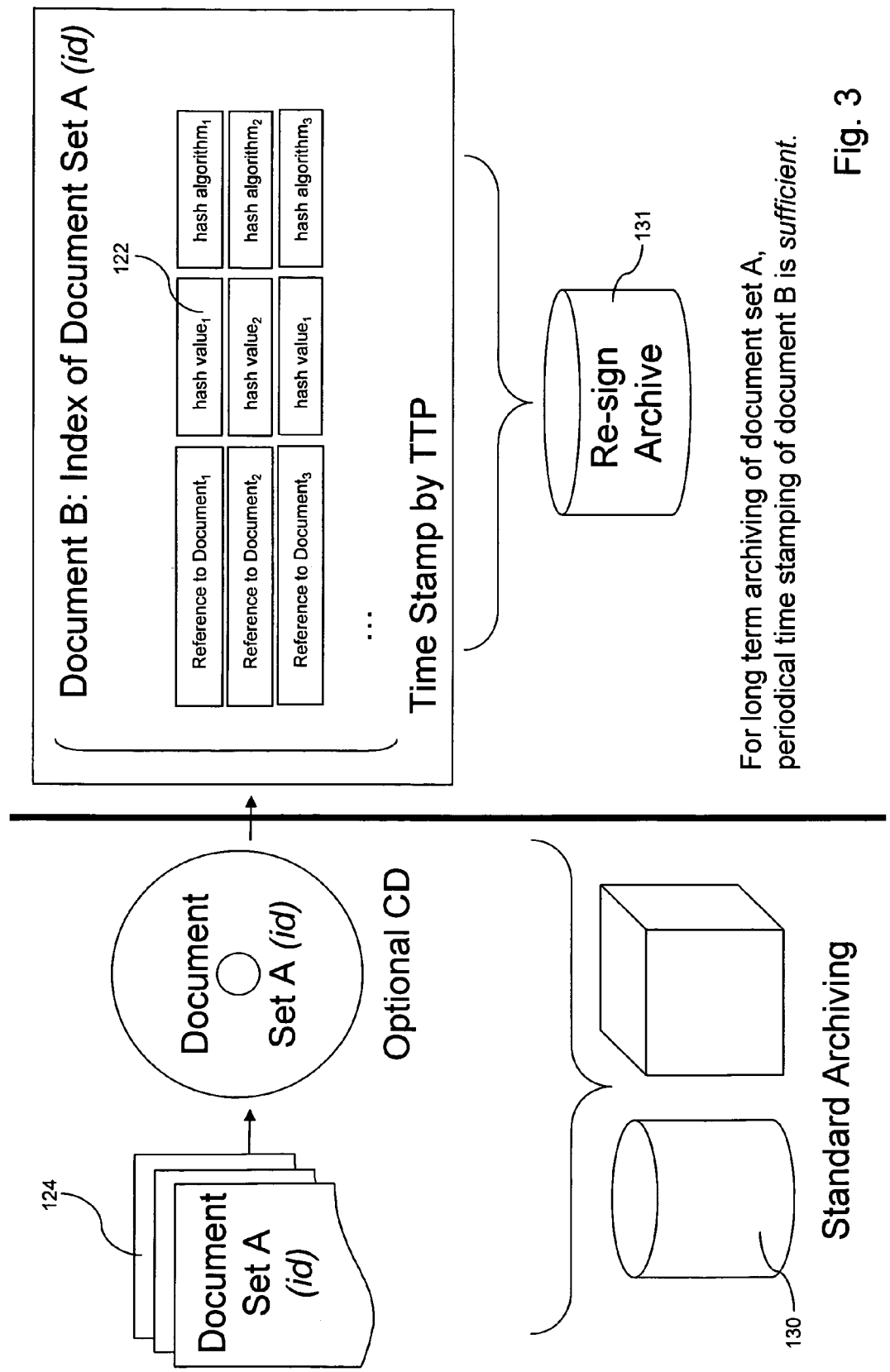
FIG. 3 shows for illustration purposes separating data content and proof of authenticity consistent with an embodiment of the invention.

The separation of data and proof of long term authenticity based on time stamping according to an embodiment of the invention is illustrated in FIG. 3. For an digitally signed electronic document 124 or a set A of digitally signed electronic documents 124 that need to be long-term archived and therefore re-signed from time to time to maintain authenticity, a hash value 122 for each electronic document is calculated and stored in a new document B together with a unique reference to the original document 124 and the used algorithm. Alternatively, a single hash value 122 may be calculated for a set of electronic documents. The electronic documents 124 may be electronic invoices, particularly electronic invoices for which qualified digital signatures are required like in Germany or other countries. However, the electronic document 124 may be any other kind of digital document, for which proof of authenticity may be required in the future.

The document identification id, the hash value(s) 122 and a description of the algorithm(s) used to calculate the hash value(s), i.e. the signature specifications 121, are stored in a separate document B. The original electronic documents 124 are stored in a standard archive 130, i.e. on a CD, that ensures retrievability up to the required number of years, e.g. in order to fulfill legal requirements. The document B should be time stamped by a trusted third party and the separate document B is archived in a second data archive 131 different from the first data archive 130 in which the electronic documents 124 are stored in a standard archive. The separate document B also has to be retrievable up to the required number of years.

Because the hash value 122 (the "fingerprint") of the original electronic documents 124 or the document set A are stored in a separate document B, handling of the documents A and B is much simpler compared to the prior art. The original document A can be stored in the usual manner and does not have to be reaccessed or retrieved for time stamping. The document B, containing the hash value 122, can be stored in a special archive and easily time stamped. Upon storing and time stamping document B it is possible to involve a third party without the risk of disclosing valuable information included in the document A to the third party.

For proof of authenticity of all files of document set A, only the document B has to be time stamped. The time stamping may be required and performed according to legal requirements, e.g. before the original signature or time stamp expires. In order to fulfill legal requirements, it is often required that re-signing is performed by a trusted third party, i.e. by a time stamping service. Such authorities fulfill very high cryptographic and legal requirements.

Figure 4:
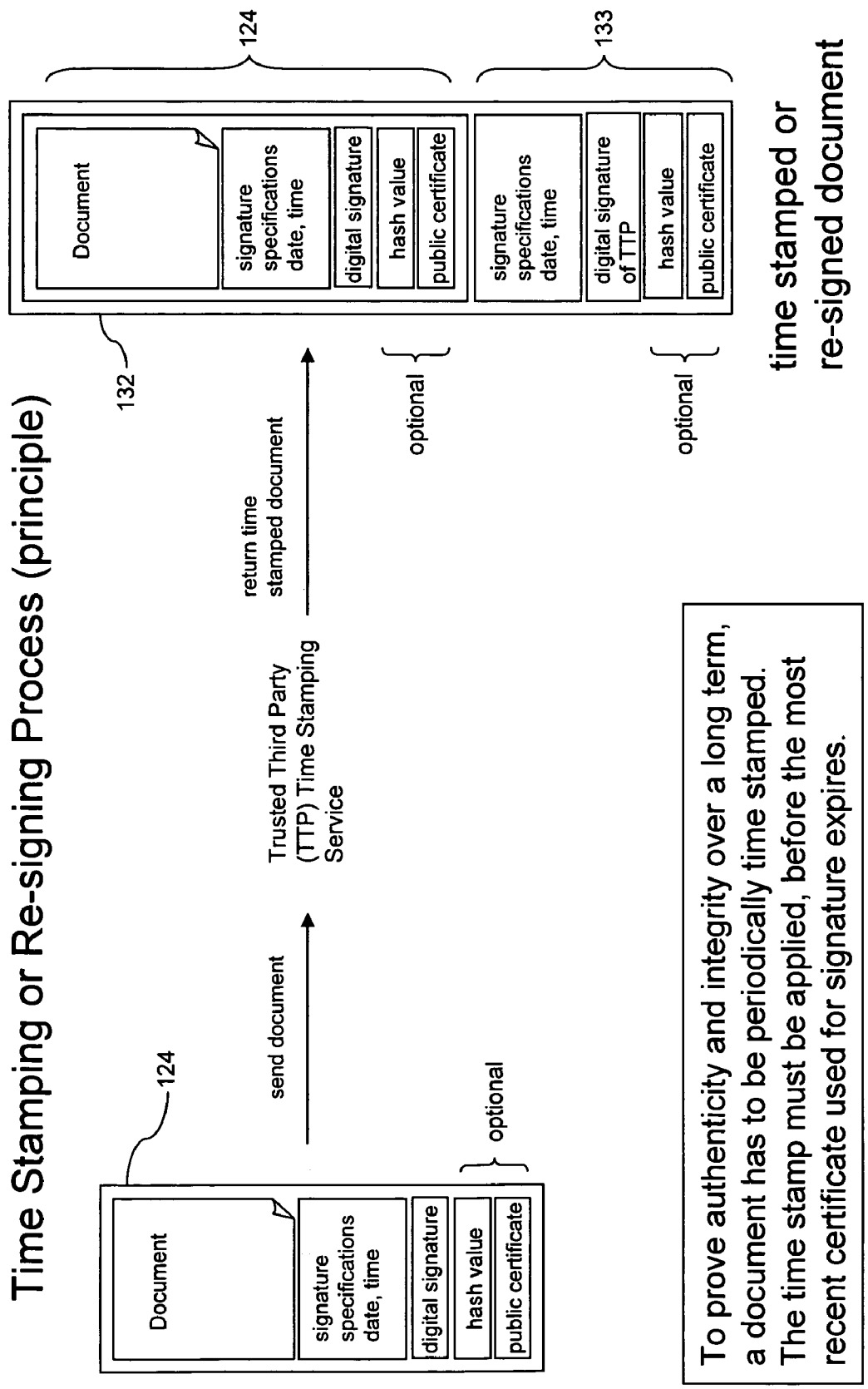
FIG. 4 is a sequence diagram illustrating the principles of a time stamping or re-signing process, consistent with an embodiment of the present invention.

Referring now to FIG. 4, the principle of a time stamping or re-signing process, consistent with an embodiment of the present invention, is illustrated. A document (120, 124, B) is sent to a trusted third party TTP which returns a time stamped or re-signed electronic document 132 comprising the original document and an additional digital signature 133, optionally including a hash value and/or a public certificate. In order to prove authenticity and integrity over a long term, a document has to be periodically time stamped. Time stamps must be applied before the most recent certificate used for signature expires.

In a re-signing process according to know techniques, the digitally signed document 124 re-signed according to FIG. 4 may also include the electronic documents 120 themselves. From FIG. 4 it is clear that the re-signing process requires retrieving that electronic document 120 and sending it to the trusted third party. In contrary, the digitally signed document 124 re-signed in accordance with the exemplary embodiment of FIG. 4 only is the digital signature, i.e., document B of FIG. 3, not including the electronic documents 120, i.e., document set A of FIG. 3. Therefore, according to embodiments of the invention, re-signing of electronic documents 120 may not require to retrieve these electronic documents 120 from the first data archive or to send them to a trusted third party for re-signing.

In the (rare) event that a proof of authenticity of an electronic document 120 or a set A of electronic documents is needed, that proof can be provided for a digitally signed electronic document 124 stored in accordance with the invention, no matter whether it has been re-signed or not. The required file, i.e. the electronic document 120 or the set A of documents has to be retrieved and extracted from the first data archive, and the corresponding separate document B has to be retrieved from the second data archive. Then the hash value(s) is(are) recalculated using the hash algorithm(s) defined in the digital signature or the separate document B. If the recalculated hash value of the file equals the hash value for the file indicated in document B and a document B is authentic, e.g., it has been digitally signed, particularly with a time stamp of a trusted third authority, and the re-signed procedure has been done correctly (if a re-signing has been performed and the last signature is verified and correct), the file of the document set A, i.e., the electronic document 120, must also be authentic.

Figure 5:
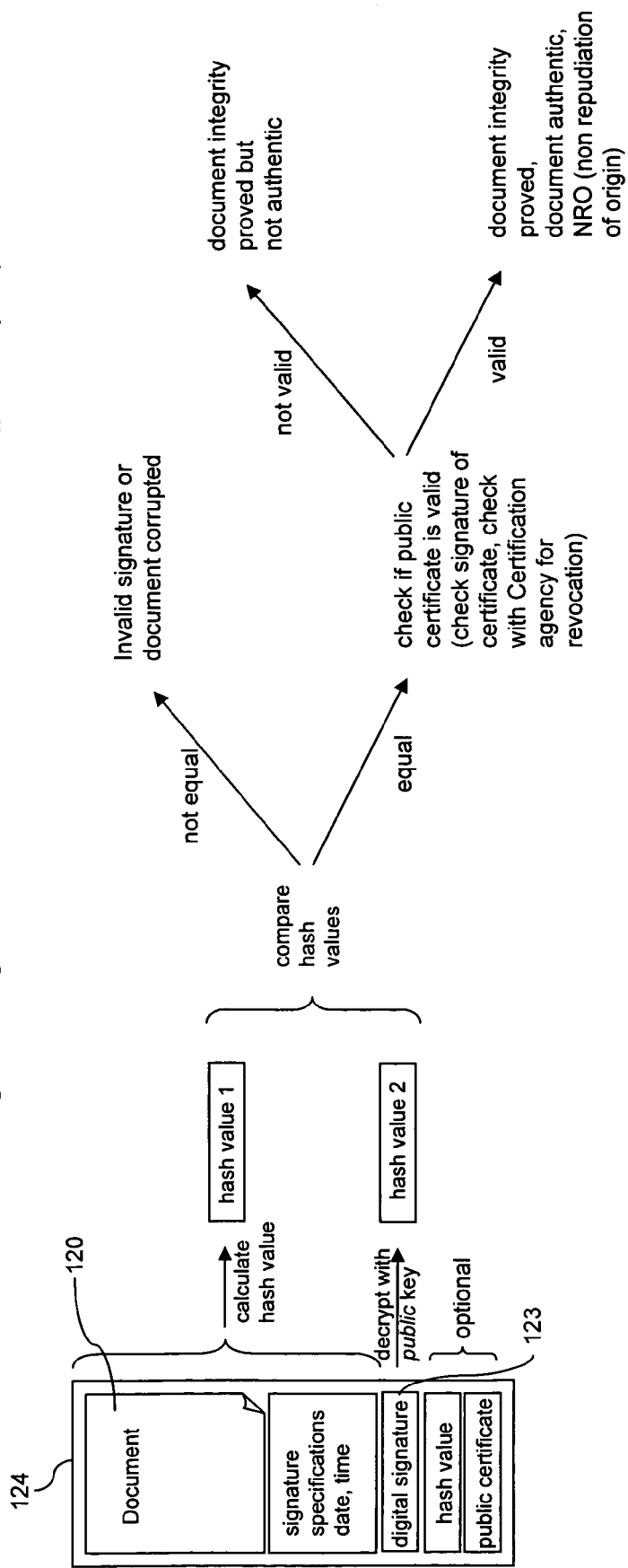
FIG. 5 is an exemplary sequence diagram illustrating a standard digital signature verification process, consistent with an embodiment of the present invention.

Referring now to FIG. 5, the principle of such a standard digital signature verification process, consistent with an embodiment of the present invention, is illustrated. The verification process may include the same steps used in known techniques, but methods according to embodiments of the invention may differ with respect to the sources, i.e., data archives from which the digitally signed document 124 is composed, in order to perform the verification. According to known techniques, the digitally signed document 124 and its time stamped versions may be stored in a single data archive, whereas in a method according to the invention the electronic document 124 or 120 (document set A) is stored in a first data archive and its time stamped hash values and optionally its digital signature 123 (document B) is stored in a second data archive.

Modifications and adaptations of embodiments of the present invention will be apparent to those skilled in the art from consideration of the specification and practice of the invention disclosed herein. The foregoing description of an implementation of embodiments of the invention has been presented for purposes of illustration and description. It is not exhaustive and does not limit embodiments of the invention to the precise form disclosed. Modifications and variations are possible in light of the above teachings or may be acquired from the practicing of embodiments of the invention. For example, the described implementation includes only software, but systems and methods consistent with the present invention may be implemented as a combination of hardware and software or in hardware alone. Additionally, although aspects of the present invention are described for being stored in memory, one skilled in the art will appreciate that these aspects can also be stored on other types of computer-readably media, such as secondary storage devices, for example hard disks, floppy disks or CD-ROM, the Internet or other propagation medium or other forms of RAM or ROM.

Computer programs based on the written description and flow charts of this invention are within the skill of an experienced developer. The various programs or program modules can be created using any of the techniques known to one skilled in the art or can be designed in connection with existing software. For example, programs or program modules can be designed in or by means of Java, C++, HTML, XML or HTML with included Java applets or in SAP R/3 or ABAP. One or more of such modules can be integrated in existing e-mail or browser software.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". Means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited.

It will be noted that when features are linked by "or", this "or" is respectively to be understood firstly as being a mathematical "or" and secondly as an "or" which excludes the respective other possibility.

The claims submitted herewith are wording proposals without prejudice for attaining extended patent protection. The applicant reserves the right to claim further combinations of features previously disclosed only in the description or any other combinations of features disclosed in the description. Expressions in brackets in the claims do not represent limiting features.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

EXEMPLARY LIST OF REFERENCE NUMBERS AND CHARACTERS

101 computer system
102 computer
103 operating means
104 operating means
105 processor
106 memory controller
107 direct access storage device
108 main memory
109 general input/output means
110 net connection
111 network computer
112a terminal interface
112b general input/output interface 112c auxiliary storage interface
113 system bus
114 electronic document
114a converted electronic document
115 receiving module
116 log file
117 processing module
118 database
119 burner
120 electronic document
121 signature specifications
122 hash value
123 digital signature
124 digitally signed document
125 public certificate
130 first data archive
131 second data archive
132 re-signed electronic document
133 additional digital signature
A set of electronic documents
B separate document
id document identification
trusted third party

What is claimed is:

1. A computer implemented method for providing long-term authenticity proof of an electronic document, the method comprising:
signing a first electronic document with a first digital signature having an expiration time by calculating, on a computer processor, a hash value of the first electronic document;
storing, by the computer processor, the first electronic document in a first data archive, wherein the first electronic document is stored in the first data archive together with at least one of the following: a signature specification, a date and time of the first digital signature, the hash value of the electronic document, and the first digital signature;
storing, in a second electronic document in a second data archive by the computer processor, hash information data regarding the hash value, the second data archive being different from the first data archive, and wherein the hash information data is stored in the second data archive together with at least one of the following: a signature specification, a date and time of the second digital signature, and the second digital signature;
renewing authenticity of the first electronic document by:
repeatedly time stamping the hash information data stored in the second electronic document before the expiration time without time stamping the first electronic document; and
updating the hash information data based on the time stamping;
re-signing the hash information data by applying a second digital signature having its own expiration time to the hash information data stored in the second data archive; and
storing the re-signed hash information data in the second electronic document in the second data archive.

2. The method according to claim 1, wherein the hash information data comprises the hash value of the electronic document.

3. The method according to claim 1, wherein the hash information data comprises data from which the hash value of the electronic document can be retrieved or calculated.

4. The method according to claim 3, wherein the hash information data comprises the first digital signature.

5. The method according to claim 1, wherein the hash information data comprises a time stamp of the digital signature.

6. The method according to claim 1, wherein the first data archive is stored on a first storage medium.

7. The method according to claim 6, wherein the second data archive is stored on a second storage medium, that second storage medium being different from the first storage medium.

8. The method according to claim 1, wherein the electronic document comprises a set of single electronic documents.

9. The method according to claim 8, wherein the set of single electronic documents is stored on the first storage medium.

10. The method according to claim 8, wherein the hash information data comprises hash information data of at least a subset of the single electronic documents.

11. The method according to claim 10, wherein the hash information data of the set of single electronic documents are stored in the second data archive.

12. The method according to claim 11, wherein the hash information data of the set of single electronic documents are stored on the second storage medium.

13. The method according to claim 10, wherein the hash information data comprises hash information data for each of the set of single electronic documents.

14. The method according to claim 13, wherein the hash information data of the set of single electronic documents are stored in the second data archive.

15. The method according to claim 14, wherein the hash information data of the set of single electronic documents are stored on the second storage medium.

16. The method according to claim 10, wherein the hash information data comprises multiple digital signatures, wherein at least one of the multiple digital signatures includes the hash information data for the subset of the single electronic documents.

17. The method according to claim 16, wherein the hash information data of the set of single electronic documents are stored in the second data archive.

18. The method according to claim 17, wherein the hash information data of the set of single electronic documents are stored on the second storage medium.

19. The method according to claim 1, wherein the hash information data stored in the second data archive comprises a hash value of the first electronic document and a description of a process used for calculating the hash value.

20. The method according to claim 1, wherein the hash information data stored in the second data archive comprises at least one of a reference value and an index value of the first electronic document for a later retrieval of the second electronic document for proving the authenticity of the first electronic document in a verification process.

21. The method according to claim 1, wherein the first digital signature comprises a time stamp from a trusted third party or a trusted authority.

22. The method according to claim 1, wherein the first digital signature comprises a certificate or a reference to a certificate of an authorized person or a legal entity.

23. The method according to claim 1, wherein the digital signature is a qualified digital signature.

24. The method according to claim 1, wherein the first data archive is a standard archive for storing data and the second data archive is a re-sign archive, different from the standard archive, for storing and re-signing the hash information data.

25. The method according to claim 1, wherein the authenticity of the first electronic document is proved in a verification process by retrieving the first electronic document from the first data archive, retrieving the corresponding hash value of the electronic document from the second data archive and performing a standard digital signature verification process.

26. The method according to claim 1, wherein the electronic document is an invoice or a credit note.

27. The method according to claim 1, wherein the re-signed hash information data comprises a time stamp from a trusted third party or a trusted authority.

28. The method according to claim 1, wherein the re-signed hash information data comprises the second digital signature using a certificate of an authorized person or a legal entity and at least fulfills legal requirements of the first digital signature.

29. The method according to claim 1, wherein the re-signed digital signature is a qualified digital signature.

30. The method according to claim 1, wherein the resigning with the second digital signature is performed before the most recent one of the first and the second digital signature is revoked or its time of validity ends.

31. The method according to claim 1, wherein the re-signing of the hash information data stored in the second data archive is performed without retrieval of the first electronic document corresponding to the hash information data.

32. The method according to claim 1, wherein the re-signing of the hash information data is performed by a service company.

33. A computer system comprising: a memory having program instructions; an input device for receiving and entering data; an output device for sending and presenting data; a storage device for storing data; and
  a processor executing the program instructions to perform a method for providing long-term authenticity proof of an electronic document, the method comprising:
    signing a first electronic document with a first digital signature having an expiration time by calculating a hash value of the first electronic document; storing the first electronic document in a first data archive, wherein the first electronic document is stored in the first data archive together with at least one of the following: a signature specification, a date and time of the first digital signature, the hash value of the electronic document, and the first digital signature;
    storing, in a second electronic document in a second data archive, hash information data regarding the hash value, the second data archive being different from the first data archive, and wherein the hash information data is stored in the second data archive together with at least one of the following: a signature specification, a date and time of the second digital signature, and the second digital signature;
    renewing authenticity of the first electronic document by:
    repeatedly time stamping the hash information data stored in the second electronic document before the expiration time without time stamping the first electronic document; and
    updating the hash information data based on the time stamping;
    re-signing the hash information data by generating a second digital signature having its own expiration time to the hash information data stored in the second data archive; and
    storing the re-signed hash information data in the second electronic document in the second data archive.

34. The system according to claim 33, wherein the first data archive is a standard archive for storing data and the second data archive is a re-sign archive, different from the standard archive, for a storing and re-signing the hash information data.

35. The system according to claim 33, wherein the processor proves the authenticity of the first electronic document by retrieving the first electronic document from the first data archive, retrieving the corresponding hash value of the second electronic document from the second data archive and performing a standard digital signature verification process with the retrieved data.

36. A non-transitory computer-readable medium having computer-executable instructions, which, when executed by a digital processor, cause the digital processor to perform a method for providing long-term authenticity proof of an electronic document, the method comprising:
    signing a first electronic document with a first digital signature having an expiration time by calculating a hash value of the first electronic document; storing the first electronic document in a first data archive, wherein the first electronic document is stored in the first data archive together with at least one of the following: a signature specification, a date and time of the first digital signature, the hash value of the electronic document, and the first digital signature;; storing, in a second electronic document in a second data archive, hash information data regarding the hash value, the second data archive being different from the first data archive, and wherein the hash information data is stored in the second data archive together with at least one of the following: a signature specification, a date and time of the second digital signature, and the second digital signature renewing authenticity of the first electronic document by:
    repeatedly time stamping the hash information data stored in the second electronic document before the expiration time without time stamping the first electronic document; and
    updating the hash information data based on the time stamping;
    re-signing the hash information data by generating a second digital signature having its own expiration time to the hash information data stored in the second data archive; and
    storing the re-signed hash information data in the second electronic document in the second data archive.

* * * * *